(12) United States Patent
Nemoto

(10) Patent No.: US 6,439,633 B2
(45) Date of Patent: Aug. 27, 2002

(54) LUGGAGE HOLDING APPARATUS FOR VEHICLE

(75) Inventor: Shuichi Nemoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/846,966

(22) Filed: May 1, 2001

(30) Foreign Application Priority Data

May 9, 2000 (JP) ........................................ 2000-136208

(51) Int. Cl.[7] .............................. B60R 5/04; B60R 7/02; B62D 33/04
(52) U.S. Cl. ................................ 296/37.14; 296/37.16; 296/37.2; 296/37.3; 410/97; 410/100; 410/118
(58) Field of Search .............................. 296/37.3, 37.2, 296/24.1, 37.16, 37.14, 180.1; 410/97, 100, 117, 118, 129

(56) References Cited

U.S. PATENT DOCUMENTS

| | | | | |
|---|---|---|---|---|
| 5,257,846 A | * | 11/1993 | Kanai et al. ............. | 296/37.16 |
| 5,632,520 A | * | 5/1997 | Butz .......................... | 296/24.1 |
| 5,715,978 A | | 2/1998 | Ackeret | |
| 5,772,370 A | * | 6/1998 | Moore ....................... | 410/117 |
| 5,791,844 A | * | 8/1998 | Anderson ................. | 410/100 |
| 5,799,845 A | * | 9/1998 | Matsushita ............... | 296/37.2 |
| 6,007,283 A | * | 12/1999 | Labeur ...................... | 410/117 |
| 6,030,160 A | * | 2/2000 | Moore ....................... | 410/118 |
| 6,247,741 B1 | * | 6/2001 | Seel et al. ................ | 296/37.16 |
| 6,290,277 B1 | * | 9/2001 | Spykerman et al. ...... | 296/24.1 |

FOREIGN PATENT DOCUMENTS

| | | | | |
|---|---|---|---|---|
| DE | 42 39 470 A | | 5/1994 | |
| DE | 4432369 | * | 3/1996 | |
| DE | 196 45 503 A | | 5/1997 | |
| DE | 198 37 685 A | | 10/1999 | |
| EP | 565430 | * | 10/1993 | .............. 296/37.16 |
| JP | 61-81446 | | 5/1986 | |
| JP | 11-99883 | | 4/1999 | |

\* cited by examiner

Primary Examiner—Stephen T. Gordon
Assistant Examiner—Hilary Gutman
(74) Attorney, Agent, or Firm—Frishauf, Holtz, Goodman & Chick, P.C.

(57) ABSTRACT

A luggage holding apparatus for a vehicle having a luggage room, a rear floor panel constituting the luggage room and a rear quarter panel constituting the luggage room includes a square opening formed on the rear floor panel in a longitudinal direction of the vehicle, a plurality of rectangular floor boards inlaid into the opening, whose respective long sides length is equal to a length of one side of the opening and whose summation of respective short sides length is equal to the length of the one side of the opening, a band-shaped luggage holding member for holding luggage in the luggage room, a retractor secured to at least one of the floor boards, capable of winding the luggage holding member therein for accommodation, at least one hook provided on at least either of the rear quarter panel and the rear floor panel and a hooking means provided at an end of the luggage holding member for hooking the luggage holding member to the hook.

13 Claims, 8 Drawing Sheets

LUGGAGE HOLDING APPARATUS FOR VEHICLE

BACKGROUND OF THE INVENTION

1. Field of the Invention

The present invention relates to a luggage holding apparatus for holding luggage loaded into a luggage compartment of a vehicle.

2. Discussion of the Related Art

A variety of luggage holding apparatuses for vehicles have been proposed. For example, Japanese Utility Model Laid-open No. Jitsu-Kai-Sho 61-81446 discloses a luggage holding apparatus comprising a housing box provided at a front end of a trunk floor, a covering net for holding luggage loaded on a floor surface, a retractor provided in the housing box for retracting the covering net and a fastening means for fastening a leading end of the net to a rear end of the trunk floor. Further, Japanese Patent Application Laid-open No. Toku-Kai-Hei 11-99883 discloses a luggage holding apparatus including a hook attached to a body section surrounding a trunk room, a band passing through at least one hole having a round, rectangular or other configuration, a connector provided on the band for connecting with the hook and a retractor provided at the front part of the trunk for winding the band.

According to those luggage holding apparatus, luggage can be held by drawing out the net or band (luggage holding members) from the retractor and by hooking these to the hook. When it is not necessary to hold luggage, the luggage holding members can be accommodated into the retractor.

However, in respective luggage holding apparatuses thus constituted, since the retractor is secured to the vehicle body, the position of the retractor can not be changed in the luggage room. Further, since the direction in which the luggage holding members are drawn out is restricted, it is difficult to change the holding position or holding method according to the size or volume of luggage.

To solve this inconvenience, it is considered that a plurality of mechanisms to fix the retractor is provided and the position of the retractor is changed using these mechanisms according to luggage, however these mechanisms make the luggage holding apparatus more complicated.

SUMMARY OF THE INVENTION

In view of the aforementioned, it is an object of the present invention to provide a luggage holding apparatus for vehicle capable of holding luggage in a luggage room in various manners.

To attain the object, the present invention provides a luggage holding apparatus for a vehicle having a rear floor panel, a luggage compartment defined over the rear floor panel and a sub trunk provided under the rear floor and opened to the luggage compartment through an opening of the rear floor panel. The apparatus includes a plurality of changeably arranged floor boards provided together to cover the opening, a retractor fixed along a side of one of the floor boards, a band-shaped luggage holding member arranged to be rolled up in the retractor and drawn out from the retractor into the luggage compartment for holding luggage, and at least one hook provided in the luggage compartment for securing a portion of the band-shaped luggage holding member.

DESCRIPTION OF THE PREFERRED EMBODIMENTS

Figure 1:
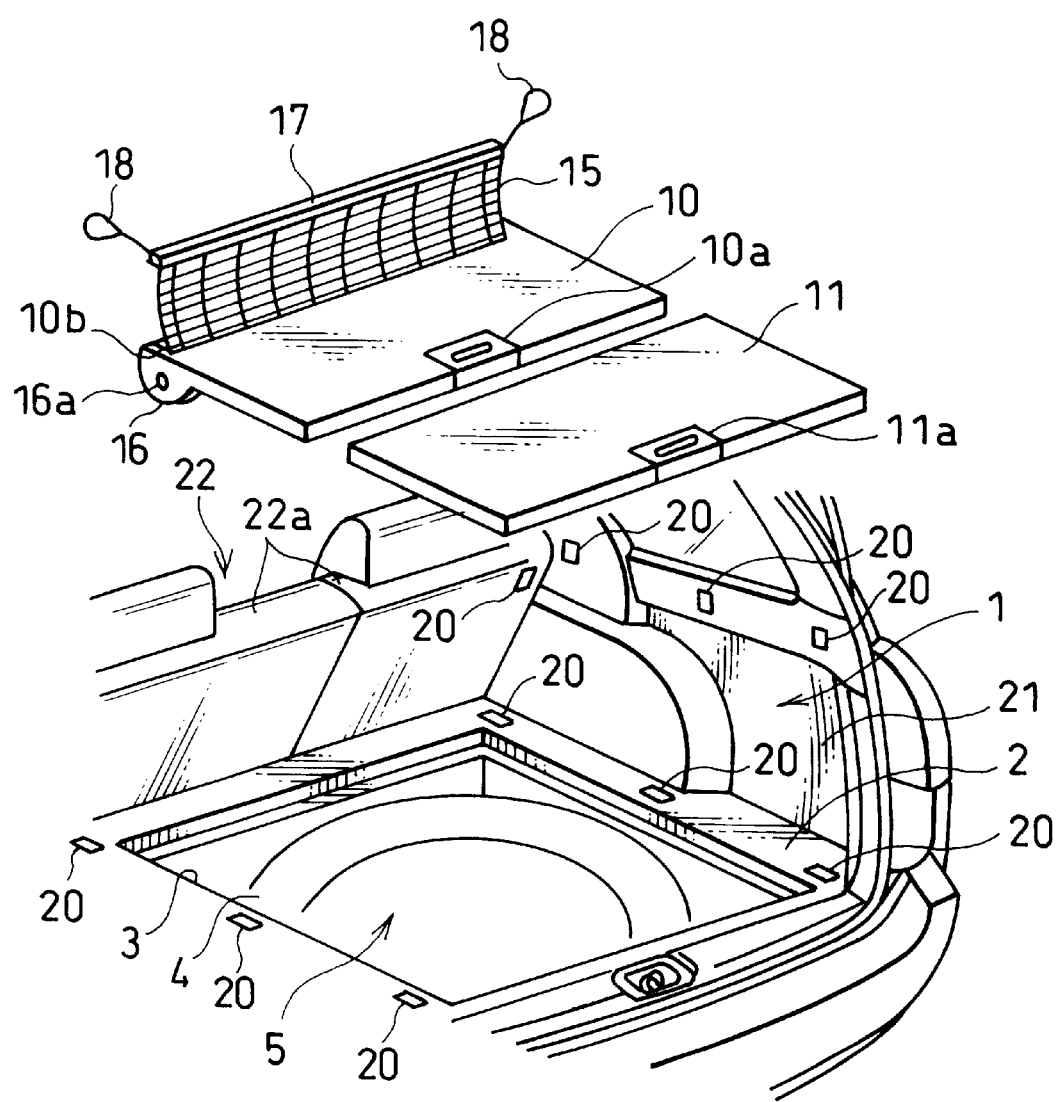
FIG. 1 is an exploded perspective view showing an interior of a luggage compartment.

Referring now to FIG. 1, reference numeral 1 denotes a luggage compartment of a station wagon type vehicle and reference numeral 2 denotes a rear floor panel constituting a floor surface of the luggage compartment 1. Further, the floor panel 2 has a square opening 3 extending in a longitudinal direction. A spare tire (not shown) is accommodated in the opening 3. Further, there is provided a sub trunk 5 for accommodating small articles in a space over a lid 4 covering the spare tire.

The sub trunk 5 is closed by a first floor board 10 and a second floor board 11 which are inlaid into the opening 3. The first and second floor boards 10, 11 are designed so as to form a flat floor flush with the rear floor panel 2, when those floor boards are inlaid into the opening 3.

The respective floor boards 10, 11 are constructed by a rectangular board whose long side has an identical length to one side of the opening and whose short side has an identical length to one half of the one side of the opening.

The floor boards 10, 11 have handles 10a, 11a respectively in order to facilitate the opening and closing of the opening 3.

The first floor board 10 has a retractor 16 in which a band like holding net 15 is rolled up. The retractor 16 is provided under the back surface of the first floor board 10 and its axis 16a is fixed along the long side of the first floor board 10. Further, the first floor board 10 has a slit lob along the long side thereof on a fixing side of the retractor 16. The net 15 can be drawn out from the top surface side of the first floor board 10 through the slit 10b.

Further, a stick like reinforcement member 17 is provided at a leading end of the net 15. A loop (hooking means) 18 for hooking the net 15 to hooks 20 is provided on both sides of the reinforcement member 17, respectively. When the net 15 is completely rolled up in the retractor 16, the reinforcement member 17 is accommodated in the slit 1ob. Further, the length of the loop 18 can be adjusted by an adjusting mechanism (not shown).

A plurality of hooks 20 are provided in the luggage compartment 1. For example, in this embodiment, there are provided three hooks 20 arranged in a longitudinal direction of the vehicle on the rear floor panel 2 along the left and right side of the opening 3, respectively. Further, there are provided three hooks 20 arranged in a longitudinal direction of the vehicle above a left and right rear quarter panel 21 constituting a left and right wall surface of the luggage compartment 1, respectively. Further, a hook 20 is provided on a back surface of a left and right back rest 22a of a foldable rear seat 22, respectively.

When the first and second floor boards 10, 11 are inlaid into the opening 3, by changing the arrangement of these floor boards, the position of the retractor 16 and the direction in which the net 15 is drawn out can be variously changed. These variations are shown in FIGS. 2a, 2b, 2c, 3a, 3b, and 3c.

Figure 2A:
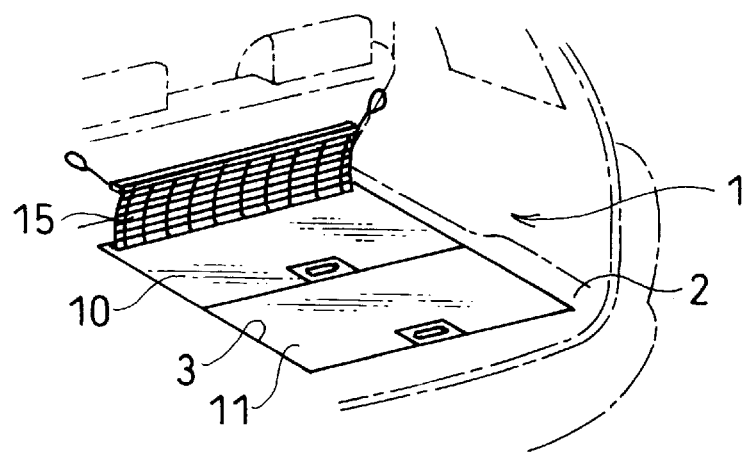
FIG. 2a is an explanatory view showing an example of the arrangement of a floor board.
Figure 2B:
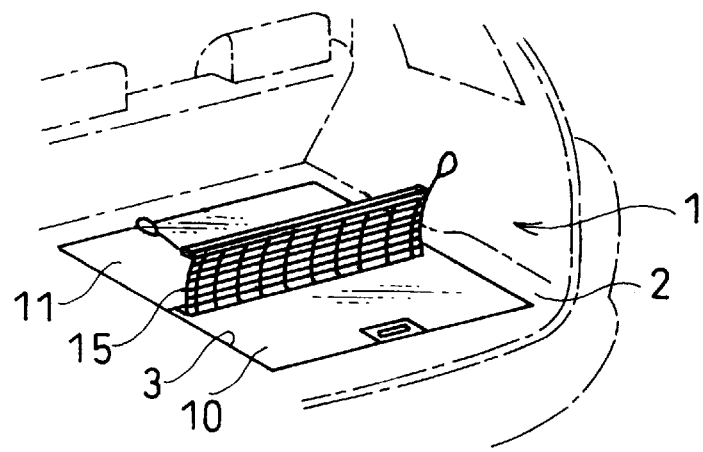
FIG. 2b is an explanatory view showing an example of the arrangement of a floor board.
Figure 2C:
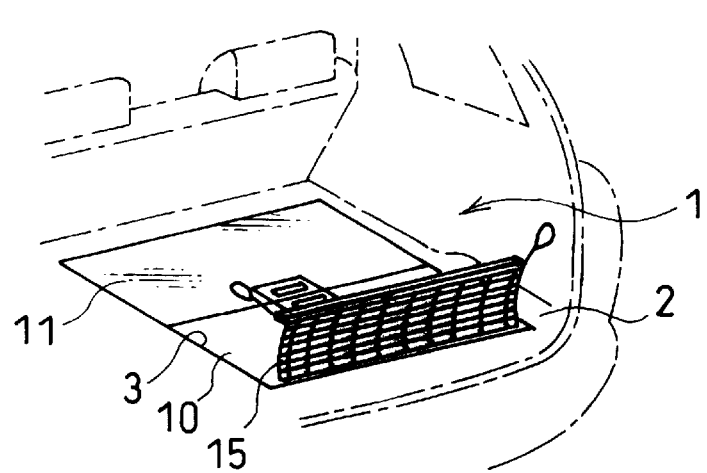
FIG. 2c is an explanatory view showing an example of the arrangement of a floor board.

As shown in FIG. 2a, for example, in a case where the first floor board 10 and the second floor board 11 are disposed in a longitudinal direction in this order and the retractor 16 is placed in front, the net 15 can be drawn out in a longitudinal direction. Further, as shown in FIG. 2b, in a case where the first floor board 10 is replaced with the second floor board 11, the position of the retractor 16 can be changed to the center of the luggage compartment 1. Further, as shown in FIG. 2c, in a case where the first floor board 10 is rotated by 180 degrees, the retractor 16 can be disposed at the rear part of the luggage compartment 1.

Figure 3A:
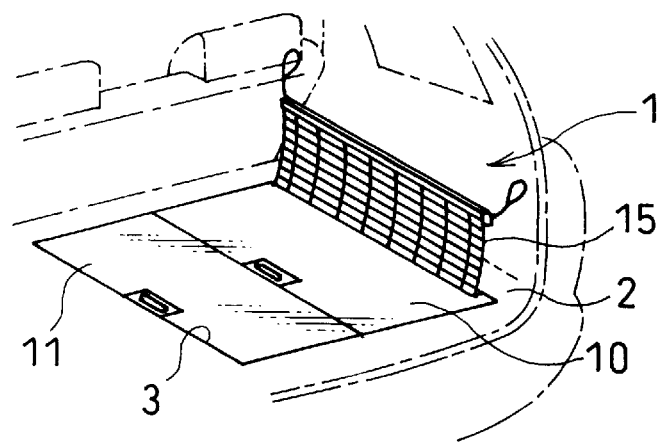
FIG. 3a is an explanatory view showing an example of the arrangement of a floor board.
Figure 3B:
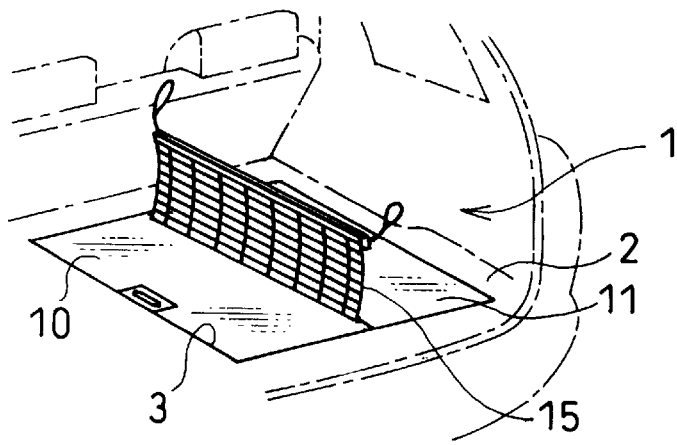
FIG. 3b is an explanatory view showing an example of the arrangement of a floor board.
Figure 3C:
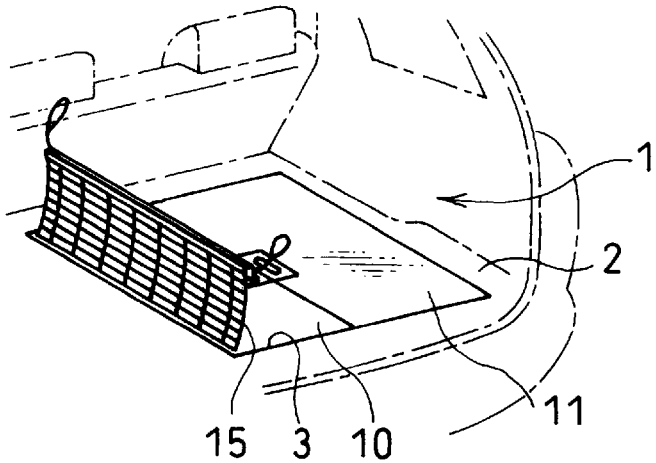
FIG. 3c is an explanatory view showing an example of the arrangement of a floor board.

On the other hand, as shown in FIG. 3a, in a case where the first floor board 10 and the second floor board 11 are arranged side by side in a lateral direction and the retractor 16 of the first floor board 10 is disposed at the right end of the luggage room, the net 15 can be drawn out in a lateral direction. Further, as shown in FIG. 3b, by exchanging the first floor board 10 with the second floor board 11 the retractor 16 can be disposed in a central position of the luggage compartment 1. Further, as shown in FIG. 3c, in a case where the first floor board 10 is rotated by 180 degrees, the retractor 16 can be disposed on the left side of the luggage compartment 1.

Figure 4:
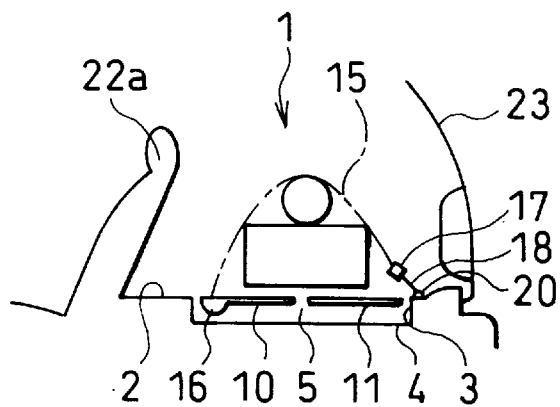
FIG. 4 is an explanatory view showing an example of the way of usage of a holding net.

Describing methods of holding luggage according to the size, the volume and configuration of luggage, as shown in FIG. 4 for example, in a case where the retractor 16 is disposed in front of the luggage compartment 1 and the direction in which the net 15 is drawn out is established to a longitudinal direction, relatively large luggage can be held in the center of the luggage compartment 1 by hooking the loop 18 of the net 15 to a hook 20 provided in the rear part of the floor panel 2. In the drawing, reference numeral 23 denotes a rear gate.

Figure 5:
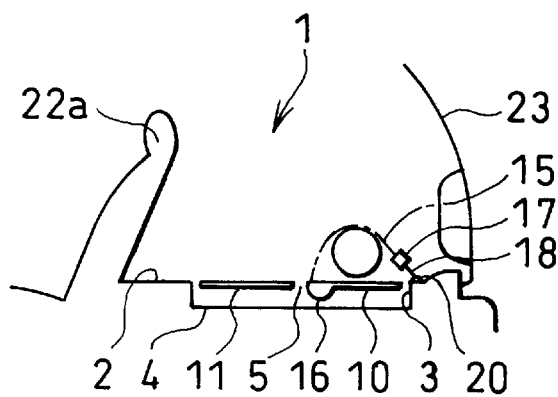
FIG. 5 is an explanatory view showing an example of the way of usage of a holding net.

Further, as shown in FIG. 5 for example, in a case where the retractor 16 is disposed in the center of the luggage compartment 1 and the direction in which the net 15 is drawn out is established to a longitudinal direction, relatively small luggage can be held in the rear part of the luggage compartment 1 by hooking the loop 18 of the net 15 to a hook provided in the rear part of the floor panel 2.

Figure 6:
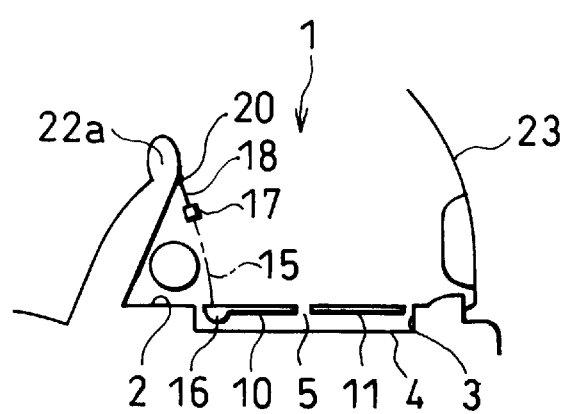
FIG. 6 is an explanatory view showing an example of the way of usage of a holding net.

Furthermore, as shown in FIG. 6, in a case where the retractor 16 is disposed in the front part of the luggage compartment 1 and the direction in which the net 15 is drawn out is established to a longitudinal direction, relatively small luggage can be held in a small space behind the rear seat 22 by hooking the loop 18 of the net 15 to a hook provided on the back surface of the back rest 22a.

Figure 7:
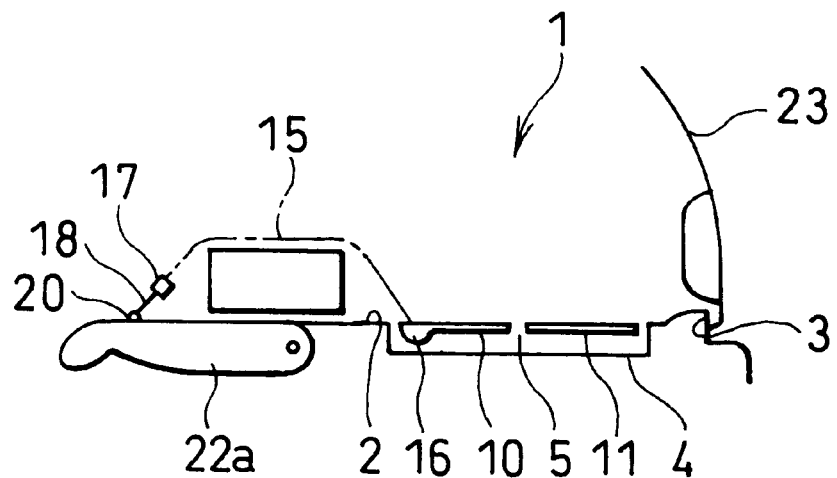
FIG. 7 is an explanatory view showing an example of the way of usage of a holding net.

Furthermore, as shown in FIG. 7, in a case where the retractor 16 is disposed in the front part of the luggage compartment 1 and the direction in which the net 15 is drawn out is established to a longitudinal direction, luggage can be held on the back surface of the back rest 22a by hooking the loop 18 of the net 15 to a hook provided on the back surface of the back rest 22a with the back rest 22a folded forwardly.

Figure 8:
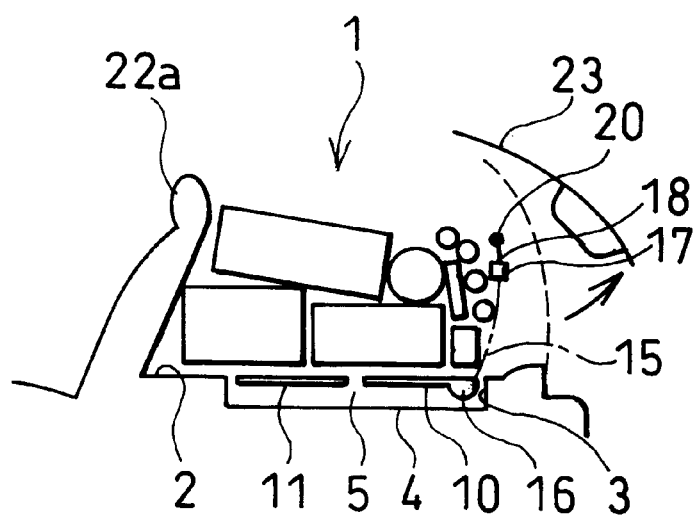
FIG. 8 is an explanatory view showing an example of the way of usage of a holding net.

Furthermore, as shown in FIG. 8, in a case where the retractor 16 is disposed in the rear part of the luggage compartment 1 and the direction in which the net 15 is drawn out is established to a longitudinal direction, a large quantity of luggage can be loaded by hooking the loop 18 of the net 15 to a hook provided in an upper rear part of the rear quarter panel 21 with the rear gate 23 open.

Figure 9:
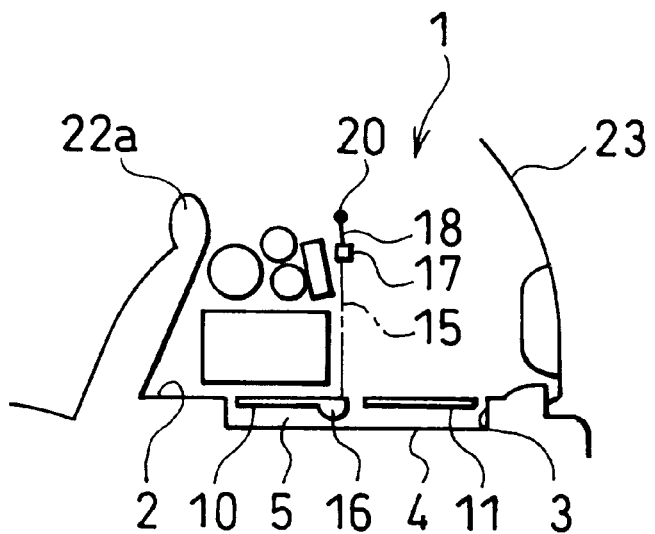
FIG. 9 is an explanatory view showing an example of the way of usage of a holding net.

Furthermore, as shown in FIG. 9, in a case where the retractor 16 is disposed in the center of the luggage compartment 1 and the direction in which the net 15 is drawn out is established to a longitudinal direction, a large quantity of luggage can be loaded by hooking the loop 18 of the net 15 to a hook provided in an upper central part of the rear quarter panel 21.

Figure 10:
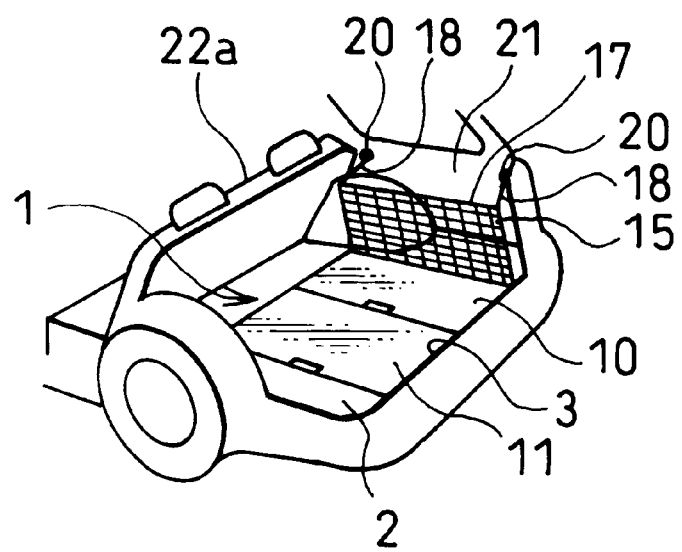
FIG. 10 is an explanatory view showing an example of the way of usage of a holding net.

Furthermore, as shown in FIG. 10, in a case where the retractor 16 is disposed on the right of the luggage compartment 1 and the direction in which the net 15 is drawn out is established to a lateral direction, a pocket capable of accommodating small articles can be formed by hooking the loop 18 of the net 15 to a hook provided in an upper front and upper rear parts of the rear quarter panel 21.

Figure 11:
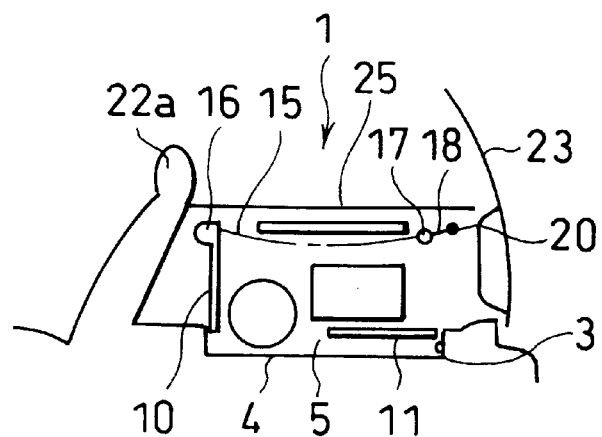
FIG. 11 is an explanatory view showing an example of the way of usage of a holding net.

Furthermore, as shown in FIG. 11, in a case where the first floorboard 10 is stood in a vertical direction in the front part of the opening 3 and the loop 18 of the net 15 is hooked to a hook provided in an upper rear part of the rear quarter panel 21, flat luggage can be laid on the net 15. In addition, other luggage can be accommodated in a lower space under the net 15. The flat luggage, moreover, can be surely held by disposing a tonneau cover 25 above the flat luggage.

According to the constituted luggage holding apparatus, since the opening 3 of the sub trunk 5 is formed in a rectangular or square shape on the rear floor panel 2, the first and second floor boards 10, 11 whose short side have a half length of a long side, close the opening 3, and the retractor 16 is provided in at least either one of these two floor boards 10, 11. Various arrangements of these floor boards are possible and when they are inlaid in the opening 3 enable variations of the position of the retractor 16 and the direction in which the net 15 is drawn out.

The position of the retractor 16 and the direction in which the net 15 is drawn out is changed in accordance with the size, volume and the like of a luggage. The luggage can be held in various manners by hooking the loop 18 of the net 15 to an arbitrary hook provided in the luggage compartment 1.

Further, since the retractor 16 is disposed on the under surface of the floor board 10, the retractor 16 can be housed in the sub trunk 5, this providing an aesthetic enhancement of the luggage compartment 1 and an efficient use of space in the luggage compartment 1.

Figure 12:
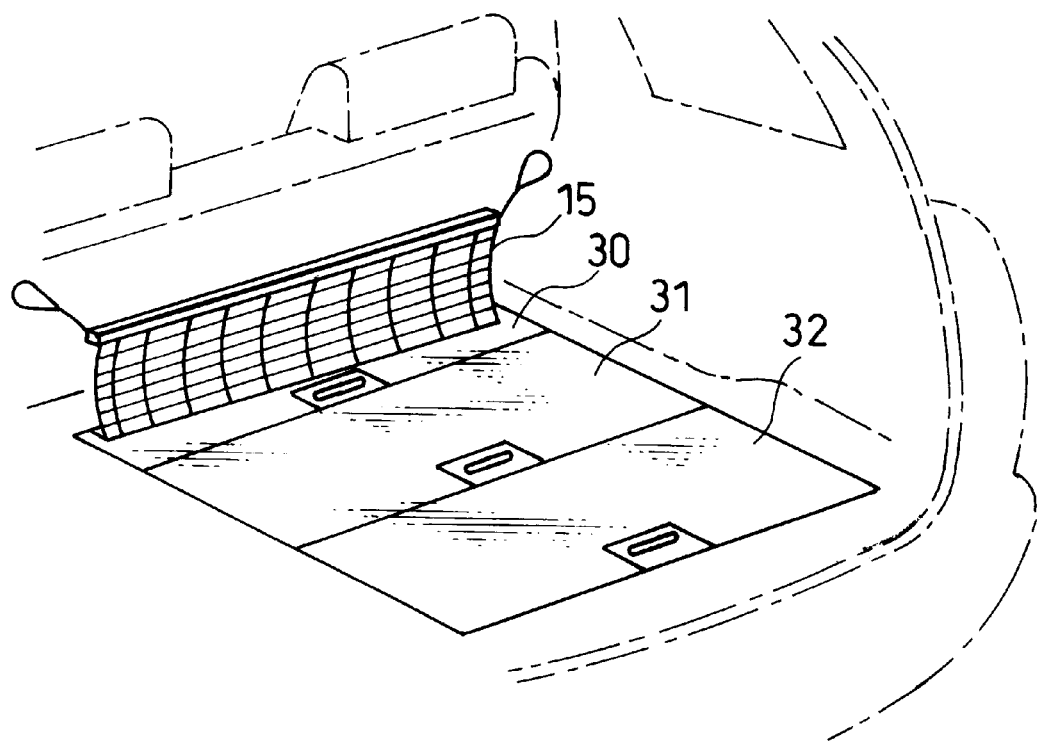
FIG. 12 is an explanatory view showing a variation of a floor board.
Figure 13:
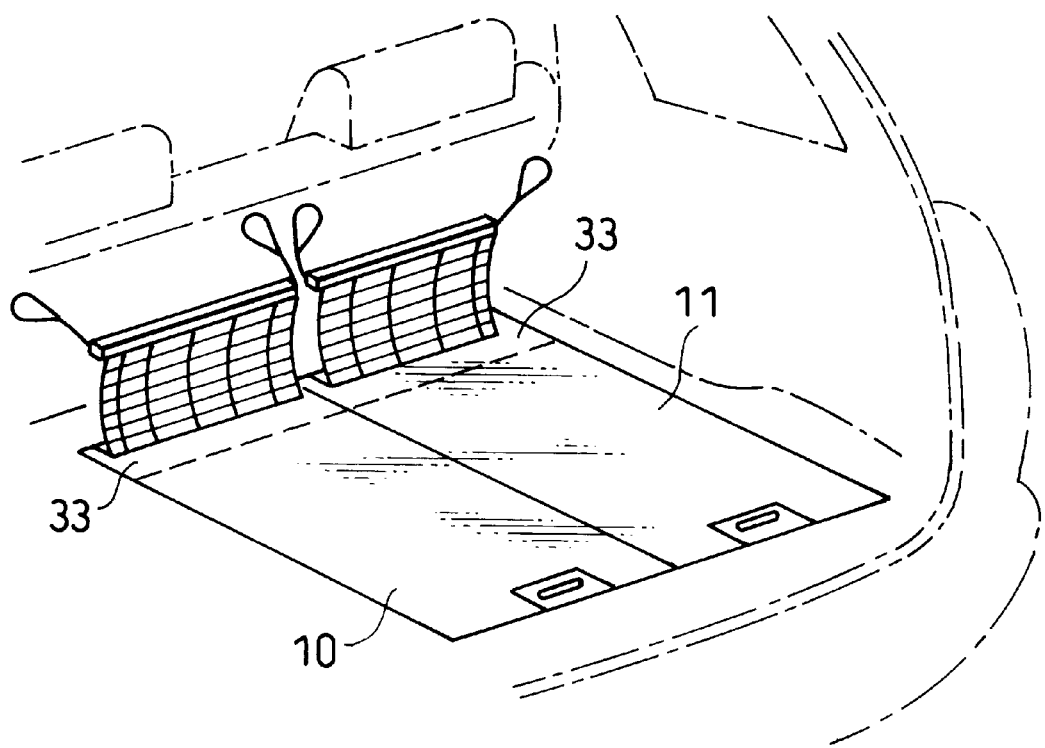
FIG. 13 is an explanatory view showing a variation of a floor board and holding net.

In this embodiment, the lid for closing the opening 3 are formed by two floor boards 10, 11 whose short side has an equal length half of the one side of the opening 3 and the retractor 16 is provided along a long side of one floor board (first floor board 10) of these two floor boards. The present invention is not necessarily limited to this embodiment. For example, as shown in FIG. 12, the lid closing the opening 3 may be divided into three floorboards 30, 31, 32 whose short side length is one third of the one side of the opening 3 and whose long side length is equal to the one side of the opening 3. Also, the lid may be divided into four or more floor boards. Further, as shown in FIG. 12, the length of respective short sides of these floor boards may be different from each other as far as the sum of the respective lengths is equal to the one side of the opening 3. Further, as shown in FIG. 13, a plurality of floor boards 10, 11 may be provided with a retractor 33. Further, the retractor 33 may be disposed along a short side of the floor boards. Further, the location of hooks 20 is not limited to those shown in this embodiment.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A luggage holding apparatus for a vehicle having a rear floor panel, a luggage compartment defined over said rear floor panel and a sub trunk provided under said rear floor panel and opened to said luggage compartment through an opening of said rear floor panel, said luggage holding apparatus comprising:
   a plurality of changeably arranged floor boards provided together to cover said opening;
   a retractor fixed to a side of one of said floor boards;
   a band-shaped luggage holding member arranged to be rolled up in said retractor and drawn out from said retractor into said luggage compartment for holding luggage; and
   at least one hook provided in said luggage compartment for securing a portion of said band-shaped luggage holding member.

2. The luggage holding apparatus according to claim 1, wherein said opening is rectangular and each of said floor boards is rectangular as well.

3. The luggage holding apparatus according to claim 1, wherein said opening is square shaped and each of said floor boards is rectangular.

4. The luggage holding apparatus according to claim 1, wherein said at least one hook is adapted to be arranged on said rear floor panel.

5. The luggage holding apparatus according to claim 1, wherein said at least one hook is adapted to be arranged on a rear quarter panel of said vehicle.

6. The luggage holding apparatus according to claim 1, wherein said at least one hook is adapted to be arranged on a back surface of a rear seat disposed in front of said luggage compartment.

7. The luggage holding apparatus according to claim 1, wherein said at least one hook is adapted to be arranged on at least one of said rear floor panel, a rear quarter panel of said vehicle, and a back surface of a rear seat of said vehicle.

8. The luggage holding apparatus according to claim 1, wherein said band-shaped luggage holding member comprises a net to be rolled up in said retractor, a reinforcement member provided at a leading end of said net, and a net of loops provided on both sides of said reinforcement member to be secured to said at least one hook provided in said luggage compartment.

9. A luggage holding apparatus for a vehicle having a rear floor panel, a luggage compartment defined over said rear floor panel and a sub trunk provided under send rear floor panel and opened to said luggage compartment through an opening of said rear floor panel, said luggage holding apparatus comprising:
   a plurality of changeably arranged floor boards provided together to cover said opening;
   a retractor secured to a back surface of a side on one of said floor boards;
   a luggage holding member arranged to be rolled up in said retractor and drawn out from said retractor into said luggage compartment for holding luggage; and
   a plurality of hooks provided in said luggage compartment, each of said hooks being selectively used to secure a portion of said band-shaped luggage holding member.

10. The luggage holding apparatus according to claim 1, wherein said retractor is fixed to a long side of one of said floor boards.

11. The luggage holding apparatus according to claim 1, wherein said retractor is fixed to a short side of one of said floor boards.

12. The luggage holding apparatus according to claim 9, wherein said retractor is secured to the back surface of a long side of one of said floor boards.

13. The luggage holding apparatus according to claim 9, wherein said retractor is secured to the back surface of a short side of one of said floor boards.

* * * * *